Nov. 7, 1967    J. W. AXELSON ETAL    3,350,929
METHOD FOR TESTING PAVING MATERIALS
Filed Sept. 9, 1964

INVENTORS
JOHN W. AXELSON
GAILLARD R. RUSSUM
BY
John A. McKinney
ATTORNEY

United States Patent Office 3,350,929
Patented Nov. 7, 1967

3,350,929
METHOD FOR TESTING PAVING MATERIALS
John W. Axelson, Plainfield, and Gaillard R. Russum, Somerville, N.J., assignors to Johns-Manville Corporation, New York, N.Y., a corporation of New York
Filed Sept. 9, 1964, Ser. No. 395,124
1 Claim. (Cl. 73—146)

ABSTRACT OF THE DISCLOSURE

A method for testing a specimen of an asphalt paving mix to determine the rutting characteristics or stability of the installed asphalt paving mix.

---

Figure 1:
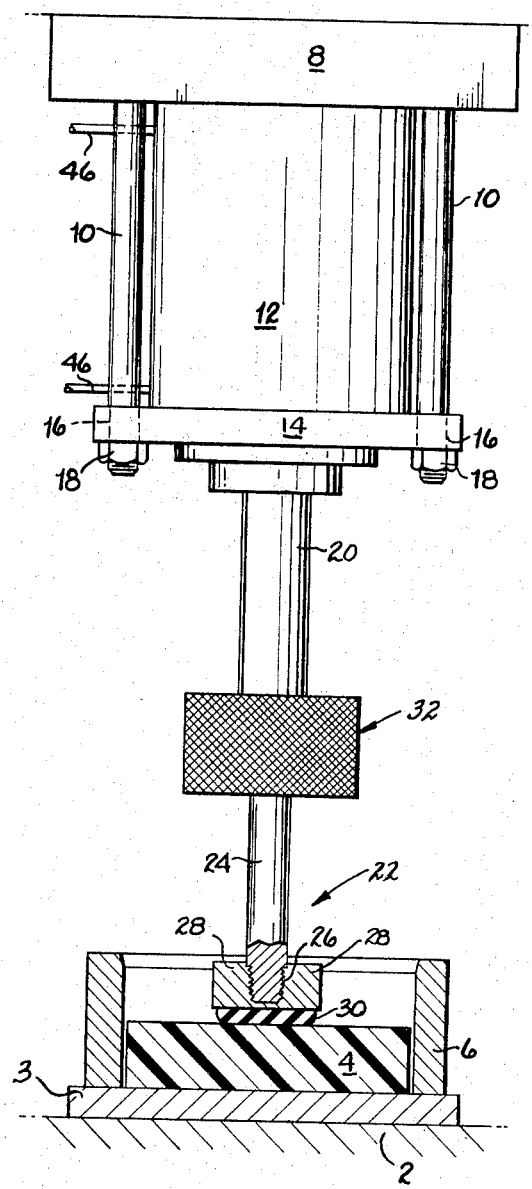

This invention relates to method and apparatus for the testing of physical characteristics of a material and more particularly is directed to method and apparatus for determining the rutting characteristics or stability of asphalt paving mixes. Although especially directed to the testing of asphalt paving mixes, it is to be understood that the principles involved may be applied in the determination of the physical characteristics of other types of materials.

One of the major problems associated with the regulation of traffic in the United States is the building of roads and the resurfacing thereof so that little or no maintenance of these roads is required. A physical characteristic which plays an important part in the life and maintenance of a road, especially one comprising an asphalt paving mix, is the tendency of such a road to rut or be unstable when high asphalt contents conducive to long life are used. This is especially so at busy intersections where traffic is controlled by stop signals and in channelized traffic areas such as on bridges and in tunnels. One of the major factors hindering the development of asphalt paving mixes having the desired physical characteristics to minimize or eliminate this tendency to rut lies in the type of equipment available for testing such asphalt paving mixes. The testing of these asphalt paving mixes in the past has been conducted on apparatus which has been either too complicated and expensive or the results obtained from such tests gave little or no valuable information. The result of this has been the testing of various asphalt paving mixes under actual installed conditions. It is readily apparent that this type of testing is undesirable. Applicants have devised a relatively simple yet efficient method and apparatus for the testing of asphalt paving mixes which method and apparatus perform to give satisfactory and beneficial results.

It is an object of the instant application to provide method and apparatus for the testing of the rutting characteristics of asphalt paving mixes.

The foregoing objects are accomplished in accordance with the instant invention by method and apparatus wherein a predetermined load is applied to a material specimen and released therefrom in a periodic manner over an extended period of time. In the preferred embodiment of the invention, the material specimen comprises an asphalt paving mix which has been compacted to a consistency comparable to that of the same asphalt paving mix as installed in a road. The asphalt paving mix is positioned in a suitable holder and predetermined loads are applied to a portion of the specimen through a rubber base actuated by an air cylinder at repeated intervals by means of a solenoid valve. A dial gauge measures the progress of any rut formation. Upon completion of a plurality of load applications to the specimen, a time-deformation curve may be made and compared with time-deformation curves of other types of specimens. Thus, a good indication of the rutting characteristics and stability of an asphalt paving mix may be readily obtained by the utilization of methods and apparatus as set forth in the instant application.

Figure 2:
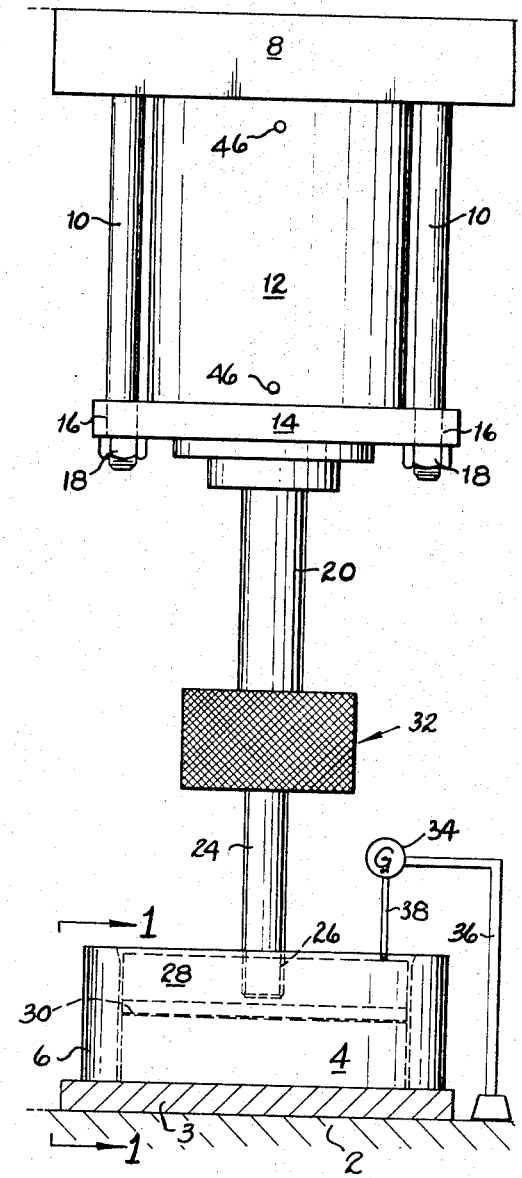

The invention will be more fully understood and further objects and advantages thereof will become apparent when reference is made to the following detailed description of a preferred embodiment of the invention and the accompanying drawing in which:

FIG. 1 is a front elevation of apparatus of the instant invention with parts thereof in section taken on the plane passing through the line 1—1 of FIG. 2; and FIG. 2 is a side elevation of the apparatus of FIG. 1.

Referring to the drawing, there is illustrated in FIGS. 1 and 2 apparatus for use in testing the rutting characteristics of materials particularly of an asphalt paving mix. A base 2 comprising a steel plate supports a hot plate 3 on which the specimen 4 is supported while within the inner peripheral wall of the holder 6 which is also supported on the base 2. The hot plate 3 is connected to suitable electrical means (not shown) and is used when it is desired to test the asphalt paving mix while hot. Specimen 4 in the preferred embodiment of the invention comprises an asphalt paving mix which has been compacted, such as by a conventional gyratory compactor, until it is similar in physical characteristics to an asphalt paving mix in its applied condition as a part of a road.

Located a distance above the base 2 is a fixed support 8 having a plurality of depending rods 10 secured thereto. An air cylinder 12 is positioned beneath the support 8 and is provided with a flange 14 having a plurality of openings 16 therein. The air cylinder 12 is positioned by passing the rods 10 through the openings 16 and securing the air cylinder 12 against the support 8 with the nuts 18. A piston rod 20 extends from the air cylinder 12 and is adapted to move toward and away from the specimen 4. A load applying assembly 22 is connected to the piston rod 20 for movement therewith and is adapted to apply the load generated through the air cylinder 12 and piston rod 20 to the specimen 4. This assembly 22 comprises a member 24 having secured at one end thereof, by any means such as the threaded connection 26, a foot 28 having a rubber base 30. At its other end, the member 24 is secured to the piston rod 20 by a conventional chuck assembly 32.

The air cylinder 12 is of the type wherein the piston rod 20 is gravity actuated so that in its normal at rest position, the load applying assembly rests under the influence of gravity on the specimen 4. When air pressure is applied to the air cylinder 12, the piston rod 20 is subjected to a predetermined load and functions to apply this load to the specimen 4. A dial gauge 34 is supported by a stand 36 sitting on the base 2 so that the feeler arm 38 contacts the foot 28 so that the rutting characteristics of the specimen may be determined during the testing period.

In operation of the apparatus, the load applying assembly 22 is secured to the piston rod 20 which is then moved by hand into the air cylinder 12. The specimen 4 is then placed within the holder 6 and the piston rod 20 is allowed to move gently into a position where the rubber base 30 of the foot 28 rests on a portion of the upper surface of the specimen 4. At all times during the test, the rubber base 30 will be in contact with the upper surface of the specimen 4. An automatic control means (not shown), such as conventional solenoid actuated valve assembly, then functions to apply and release a predetermined load to the piston rod 20 through the air cylinder 12. The solenoid valve is actuated by a timing mechanism (not shown) to allow a predetermined time for load application and between load applications. This load is applied to the specimen 4 by the rubber base 30. As the load is increased, the rubber base 30 deforms slightly so as to increase by a relatively small amount the cross sectional area through which the load is applied to the specimen 4. This deformation of the rubber base 30 simulates the deformation of a tire as it contacts the road surface.

In one of the embodiments of the invention, a load of 1250 pounds, equivalent to 100 p.s.i. truck tire pressure, was applied to the specimen 4 by the utilization of 100 p.s.i. of air pressure to the air cylinder 12. The load applying and releasing cycle was approximately 0.6 second including a period of 0.1 second for load application. In the standard test for determining the rutting characteristics of an asphalt paving mix, a specimen is subjected to the above load for a number of the stated cycles and measurements of the sample deformation are recorded from the dial gauge at specified time intervals. The readings of the dial gauge are made during the time when no load is being applied to the specimen by actuation of the air cylinder 12. A final measurement of the rutting characteristics is also made at the completion of the test. This time-deformation curve is then compared to other time-deformation curves of other specimens. In this manner, various types of asphalt paving mixes may be directly compared to each other without the necessity of placing these asphalt paving mixes in an actual road. Besides making the measurement for the time-deformation curve, the appearance of each specimen after the completion of a test is carefully recorded.

Each specimen used in the apparatus in the preferred embodiment of the invention comprises a solid, generally cylindrical, compacted asphalt paving mix having a diameter of approximately 4 inches and a thickness of ¾ inch. The specimen fits with the holder 6 so that it is either in contact with the inner peripheral surface of the holder 6 or is spaced a distance from the inner peripheral surface of the holder. The relative location between the holder and the specimen depends upon the type of information desired. The rubber base 30 is 4 inches in length, 2 inches in width, and ½ inch in thickness. The rubber in the base 30 has a durometer of 70. It is understood that the foregoing dimensions are given for illustration purposes only and in no way limit the scope of the invention.

While the invention has been described in rather full detail, it will be understood that these details need not be strictly adhered to and that various changes and modifications may suggest themselves to one skilled in the art, all falling within the scope of the invention as defined by the subjoined claim.

What we claim:

Method for testing the rutting characteristics of asphalt paving mixes comprising:
- (a) preparing a specimen comprising an asphalt paving mix having characteristics representative of such asphalt paving mix in its applied condition as part of a road,
- (b) inserting said specimen within a holder,
- (c) contacting a portion of a surface of said specimen with a load applying means having an area in contact with said surface,
- (d) applying to said portion of said specimen through said load applying means a load similar to a normal load to be applied to said asphalt paving mix when in its applied condition,
- (e) increasing said area of contact of said load applying means as the amount of said load is being increased,
- (f) releasing said load,
- (g) repeating said load applying and releasing steps at periodic intervals to the same portion of said specimen for a predetermined period of time while maintaining contact between said specimen and said load applying means, and
- (h) measuring the deformation of said portion of said specimen before and after each application of said load to determine the rutting characteristics of said asphalt paving mix.

References Cited
UNITED STATES PATENTS

| | | | |
|---|---|---|---|
| 403,676 | 5/1889 | Keep | 73—12 |
| 1,789,846 | 1/1931 | Skidmore et al. | 73—15.6 |
| 2,036,443 | 4/1936 | Taylor | 73—15.6 |
| 2,545,482 | 3/1951 | Manjoine et al. | 73—15.3 X |
| 2,670,624 | 3/1954 | Faris et al. | 73—15.6 |

JAMES J. GILL, *Acting Primary Examiner.*

RICHARD C. QUEISSER, *Examiner.*

J. W. MYRACLE, *Assistant Examiner.*